US007447795B2

(12) United States Patent
Naghshineh et al.

(10) Patent No.: US 7,447,795 B2
(45) Date of Patent: Nov. 4, 2008

(54) MULTI-PURPOSE SWITCHING NETWORK INTERFACE CONTROLLER

(75) Inventors: Kianoosh Naghshineh, Palo Alto, CA (US); Mark Stadler, Mountain View, CA (US); Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 658 days.

(21) Appl. No.: 10/474,500

(22) PCT Filed: Apr. 11, 2002

(86) PCT No.: PCT/US02/12679

§ 371 (c)(1), (2), (4) Date: Apr. 19, 2004

(87) PCT Pub. No.: WO02/084499

PCT Pub. Date: Oct. 24, 2002

(65) Prior Publication Data

US 2004/0172485 A1 Sep. 2, 2004

Related U.S. Application Data

(60) Provisional application No. 60/283,286, filed on Oct. 4, 2000.

(51) Int. Cl.
*G06F 13/00* (2006.01)

(52) U.S. Cl. .................................................. 709/238
(58) Field of Classification Search .................. 709/238
See application file for complete search history.

(56) References Cited

U.S. PATENT DOCUMENTS

| 5,497,476 A | 3/1996 | Oldfield et al. |
| 6,087,581 A | 7/2000 | Emmer et al. |
| 6,226,680 B1 | 5/2001 | Boucher et al. |
| 6,247,060 B1 | 6/2001 | Boucher et al. |

(Continued)

OTHER PUBLICATIONS

International Search Report mailed on Jul. 23, 2002, for PCT/US02/12679 filed on Apr. 11, 2002, 4 pages.

(Continued)

*Primary Examiner*—Robert B Harrell
(74) *Attorney, Agent, or Firm*—Beyer Law Group LLP

(57) ABSTRACT

A network interface controller includes a plurality of scatter gather circuits (104a-104d) connectable to a host via a bus (101). A packet buffer (112) is configured for communication with the scatter gather circuits (104a-104d). A plurality of access circuits (110a-110d) are configured to access external network connections. An optional forwarding engine (108) is selectable to generate routing information corresponding to data received via the access circuits (110a-110d) and to provide the routing information to the packet buffer (112).

7 Claims, 7 Drawing Sheets

U.S. PATENT DOCUMENTS

| | | | |
|---|---|---|---|
| 6,334,153 B2 | 12/2001 | Boucher et al. |
| 6,389,479 B1 | 5/2002 | Boucher et al. |
| 6,393,487 B2 | 5/2002 | Boucher et al. |
| 6,397,316 B2 | 5/2002 | Fesas, Jr. |
| 6,427,171 B1 | 7/2002 | Craft et al. |
| 6,427,173 B1 | 7/2002 | Boucher et al. |
| 6,434,620 B1 | 8/2002 | Boucher et al. |
| 6,470,415 B1 | 10/2002 | Starr et al. |
| 6,591,302 B2 | 7/2003 | Boucher et al. |
| 6,658,480 B2 | 12/2003 | Boucher et al. |
| 6,687,758 B2 | 2/2004 | Craft et al. |
| 6,697,868 B2 | 2/2004 | Craft et al. |
| 6,708,223 B1 * | 3/2004 | Wang et al. ............... 719/315 |
| 6,751,665 B2 | 6/2004 | Philbrick et al. |
| 6,757,746 B2 | 6/2004 | Boucher et al. |
| 6,807,581 B1 | 10/2004 | Starr et al. |
| 6,813,652 B2 | 11/2004 | Stadler et al. |
| 6,938,092 B2 | 8/2005 | Burns |
| 6,941,386 B2 | 9/2005 | Craft et al. |
| 6,965,941 B2 | 11/2005 | Boucher et al. |
| 6,996,070 B2 | 2/2006 | Starr et al. |
| 7,042,898 B2 | 5/2006 | Blightman et al. |
| 7,076,568 B2 | 7/2006 | Philbrick et al. |
| 7,089,326 B2 | 8/2006 | Boucher et al. |
| 7,093,099 B2 | 8/2006 | Bodas et al. |
| 7,124,205 B2 | 10/2006 | Craft et al. |
| 7,133,902 B2 | 11/2006 | Saha et al. |
| 7,133,914 B1 | 11/2006 | Holbrook |
| 7,133,940 B2 | 11/2006 | Blightman et al. |
| 7,167,926 B1 | 1/2007 | Boucher et al. |
| 7,167,927 B2 | 1/2007 | Philbrick et al. |
| 7,174,393 B2 | 2/2007 | Boucher et al. |
| 7,185,266 B2 | 2/2007 | Blightman et al. |
| 7,191,241 B2 | 3/2007 | Boucher et al. |
| 7,191,318 B2 | 3/2007 | Tripathy et al. |
| 2001/0010046 A1 | 7/2001 | Muyres et al. |
| 2001/0021949 A1 | 9/2001 | Blightman et al. |
| 2003/0018516 A1 | 1/2003 | Ayala et al. |
| 2003/0200284 A1 | 10/2003 | Philbrick et al. |
| 2004/0030745 A1 | 2/2004 | Boucher et al. |
| 2004/0054813 A1 | 3/2004 | Boucher et al. |
| 2004/0062245 A1 | 4/2004 | Sharp et al. |
| 2004/0062246 A1 | 4/2004 | Boucher et al. |
| 2004/0064578 A1 | 4/2004 | Boucher et al. |
| 2004/0064590 A1 | 4/2004 | Starr et al. |
| 2004/0073703 A1 | 4/2004 | Boucher et al. |
| 2004/0078480 A1 | 4/2004 | Boucher et al. |
| 2004/0088262 A1 | 5/2004 | Boucher et al. |
| 2004/0100952 A1 | 5/2004 | Boucher et al. |
| 2004/0111535 A1 | 6/2004 | Boucher et al. |
| 2004/0158640 A1 | 8/2004 | Philbrick et al. |
| 2004/0165592 A1 | 8/2004 | Chen et al. |
| 2004/0199808 A1 | 10/2004 | Freimuth et al. |
| 2004/0240435 A1 | 12/2004 | Craft et al. |
| 2005/0071490 A1 | 3/2005 | Craft et al. |
| 2005/0190787 A1 | 9/2005 | Kuik et al. |
| 2005/0216597 A1 | 9/2005 | Shah et al. |
| 2005/0259678 A1 | 11/2005 | Gaur |

OTHER PUBLICATIONS

Clark et al., "*An Analysis of TCP Processing Overhead*," IEEE Communications Magazine, Jun. 1989, pp. 23-29.

Woodside et al., "*The Protocol Bypass Concept for High Speed OSI Data Transfer*," Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf, undated.

Rütsche et al., "*TCP/IP on the Parallel Protocol Engine*," High Performance Networking, (IV, C-14), Elsevier Science Publishers, B.V. North Holland 1993.

Thia et al., "*High-Speed OSI Protocol Bypass Algorithm with Window Flow Control*," IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture*," Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems*," IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols*," http://www.hpl.hp.com/techreports/93/HPL-93-46.pdf, Jul. 1993, 18 Pages.

TRM Technologies, Inc., "*L4/L7 Switching*," Downloaded from http://www.trm.ca/pages/t-tech7.html on Feb. 16, 2006, 3 Pages.

Madsen et al., "*Wireless Data Communication*," Fall 2003 Presentation, Wireless Networks Division (WING), Allborg University.

Yocum et al., "*Anypoint: Extensible Transport Switching on the Edge*," Proceedings of the 4th USENIX Symposium on Internet Technologies and Systems, Mar. 26-28, 2003, Seattle, WA, USA.

Office Action in U.S. Appl. No. 11/137,146, mailed Mar. 5, 2008.

Office Action in U.S. Appl. No. 11/137,140, mailed Feb. 5, 2008.

\* cited by examiner

MULTI-PURPOSE SWITCHING NETWORK INTERFACE CONTROLLER

TECHNICAL FIELD

The present invention is in the field of network interface controllers and, in particular, is related to a switching network interface controller that is configurable for use in a variety of different networking configurations.

BACKGROUND

There are a variety of networking applications for which, conventionally, various specialized hardware is available. It would be desirable to have a network interface controller solution that is flexibly configured for use in these various applications.

SUMMARY

A reconfigurable network interface controller circuit is provided for various networking operations. The circuit is scalable, and provides for redundancy in such networking operations.

The network interface controller includes a plurality of scatter gather circuits connectable to a host via a bus. A packet buffer is configured for communication with the scatter gather circuits. A plurality of access circuits are configured to access external network connections. An optional forwarding engine is selectable to generate routing information corresponding to data received via the access circuits and to provide the routing information to the packet buffer.

DETAILED DESCRIPTION

Figure 1:
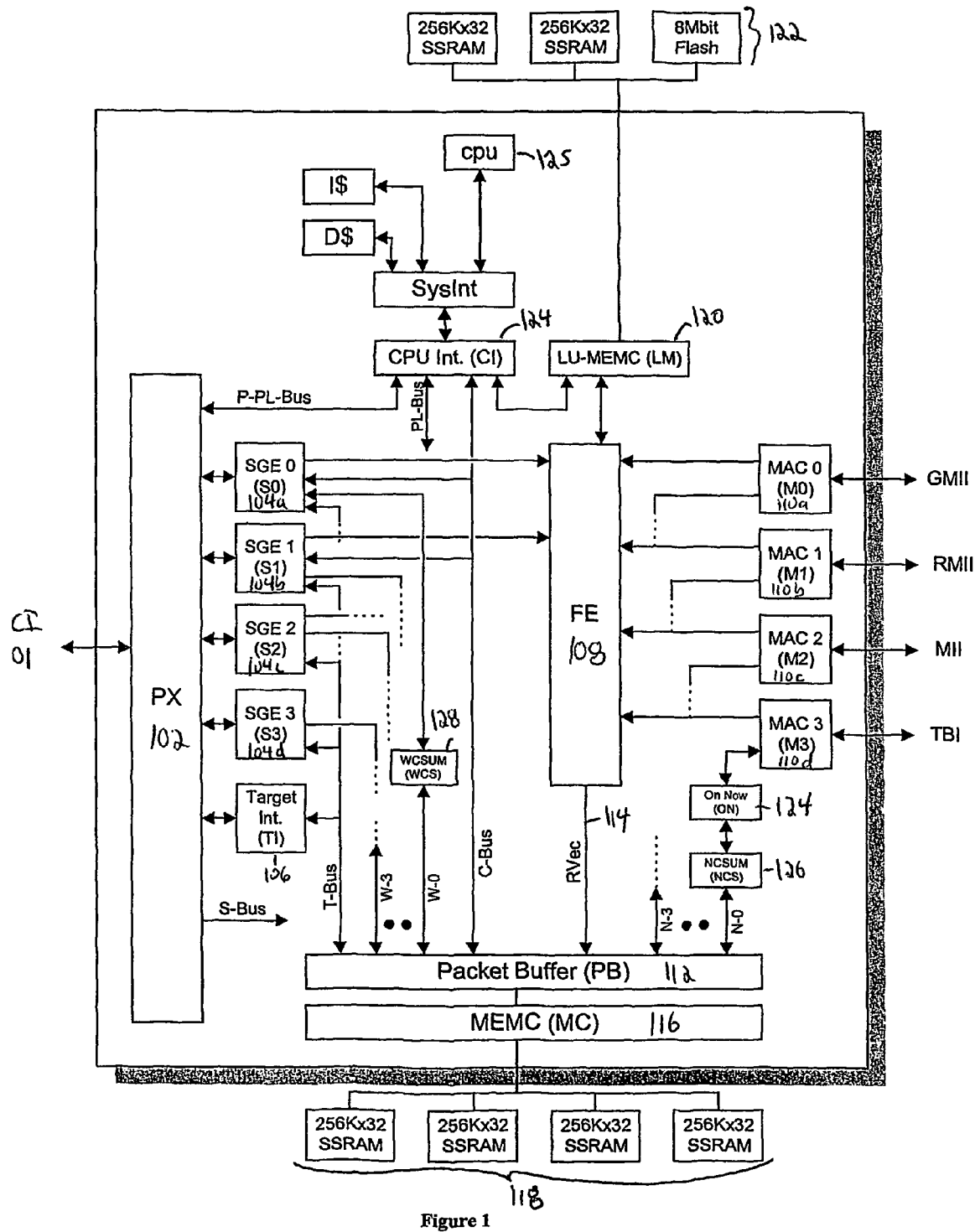
FIG. 1 schematically illustrates an example multipurpose network interface controller circuit.

Turning now to FIG. 1, an example configurable network interface controller circuit 100 is described. In some embodiments, the FIG. 1 network interface controller circuit is implemented in an application specific integrated circuit (ASIC), such as a field-programmable gate array (FPGA). In one example, the circuit is configurable to implement applications such as:

Multi-Channel Ethernet NIC Controller
L2/L3 Ethernet Switch
System Controller
SOHO Router
Network Processor The various blocks of the FIG. 1 example are now summarized.

PCI-X CORE (PX 102)

This is a standard quad-function PCI-X core, with 4 identical Master interfaces to SGE's 104a through 104d, and one target interface TI 106. This block in addition houses the Serial ROM interface logic.

Forwarding Engine (FE 108)

This module makes routing decisions based on a vector that it receives from the MAC 110 or the SGE 104 modules. The results of the routing decisions are conveyed to the packet buffer PB 112 via the Route Vector bus 114.

MAC (Mn 110)

This is a 10/100/1000 MAC module. In one example, this module includes VLAN Tag and Station Address logic (which are normally disabled in the presence of a Forwarding Engine).

Packet Buffer (PB 112)

This is a general purpose queuing engine core switch fabric, that allows management of arbitrary sized packets. A particular example of the PB 112 is described in U.S. Provisional Patent Application No. 60/283,285 filed Apr. 11, 2001 and incorporated herein by reference in its entirety.

Memory Controller (MC 116)

This is a generic memory controller that can control, for example, SSRAM memories 118.

Lookup Memory Controller (LM 120)

This is an SSRAM only memory controller that provides a path to an external memory 122 (e.g., for a forwarding table and/or instruction memory).

CPU Interface (CI 124)

This module is a collection of muxes and base addresses that switches various busses and manages the address map of an on-board processor 125. This module decodes the PL-Bus regions and generates chip selects to various modules.

Scatter Gather Engine (SGn 104)

This module handles the Scatter Gather operation in a NIC mode, provides a path to the packet buffer 112 from PX 102 in the Switch mode, and provides a path to the packet buffer 112 from the CPU 125 in the System Controller mode.

Wake up, On Now Logic (ON 124)

This module implements power management functions.

Narrow Checksum (NC 126)

This module calculates the TCP/IP/HTTP/UDP checksums and provides the result to the packet buffer 112 upon completion of a frame arriving from the MAC 110.

Wide Checksum (WC)

This module calculates the TCP/IP/HTTP/UDP checksums and provides the result to the packet buffer PB 112 upon the completion of a frame as it is arriving from the PCI bus 101 via the PX 102.

In all modes of the operation (NIC, Switch, etc.), the data is pushed to the SGE 104 by the packet buffer 112 and to the packet buffer 112 by the SGE 104.

Clocking within the FIG. 1 example is now described. Specifically, the components of the FIG. 1 example operate in three different clock domains. These clock domains include the core clock domain (which includes the on-board CPU 125 and the memory interfaces (LM 120 and MEMC 116); the MAC 110 clock domains (which, in some examples, includes several actual clock regimes); and the PCI-X 101 clock domain. In some examples, no phase lock loops are employed.

In cases where the FIG. 1 example is an FPGA as opposed to an ASIC, the FPGA clocking is the same as the ASIC clocking except for the MAC clock section. Further, some 10 delay lines are inherent to the FPGA IO pads, and are explicitly built in the ASIC configuration.

In reset, all clock domains are synchronized to the PCI-X clock domain. The PHY chips can be reset individually. In addition, soft reset resources allow the local resetting of the FIG. 1 circuitry by the local processor 125 under control of local firmware.

In accordance with one example, the FIG. 1 circuit is operable in at least four different modes by reconfiguring the operation of the various modules. Each of these four modes of operation are now described. In the description, the Receive and Transmit nomenclatures are always with reference to the wire (i.e., receive from the wire and transmit to the wire) unless otherwise specified.

Figure 2A:
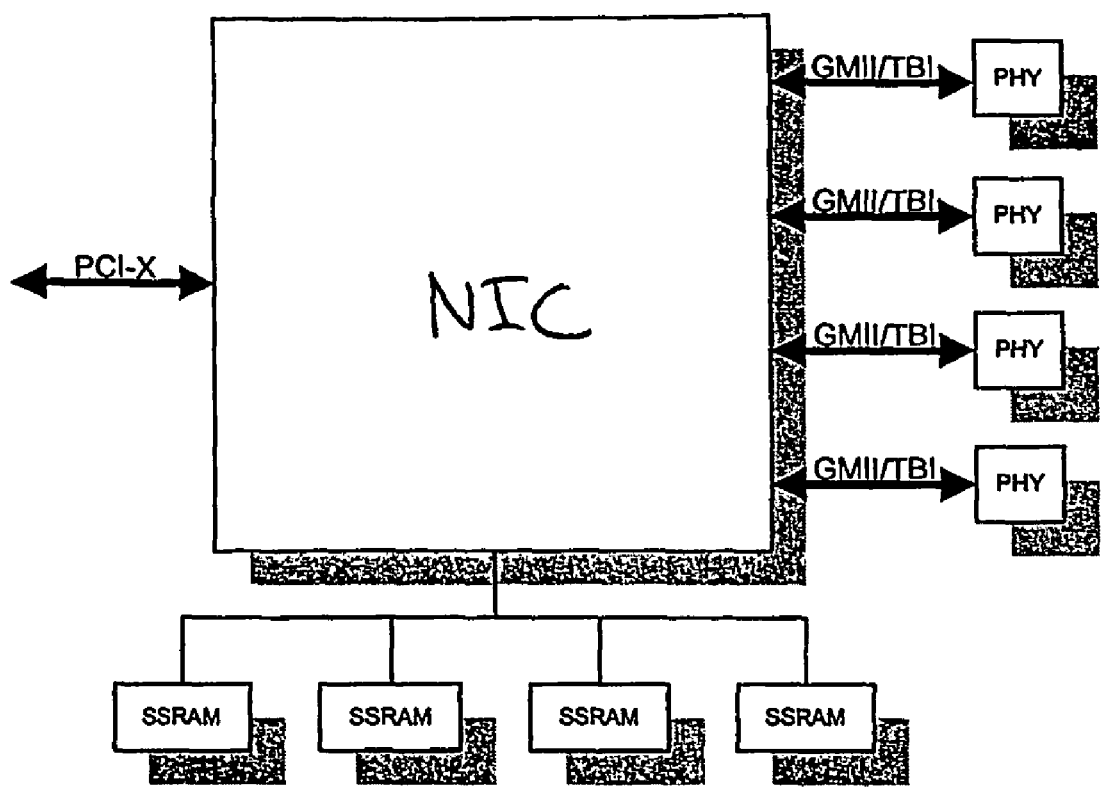
FIGS. 2A and 2B illustrate the FIG. 1 circuit in a network interface controller configuration.
Figure 2B:
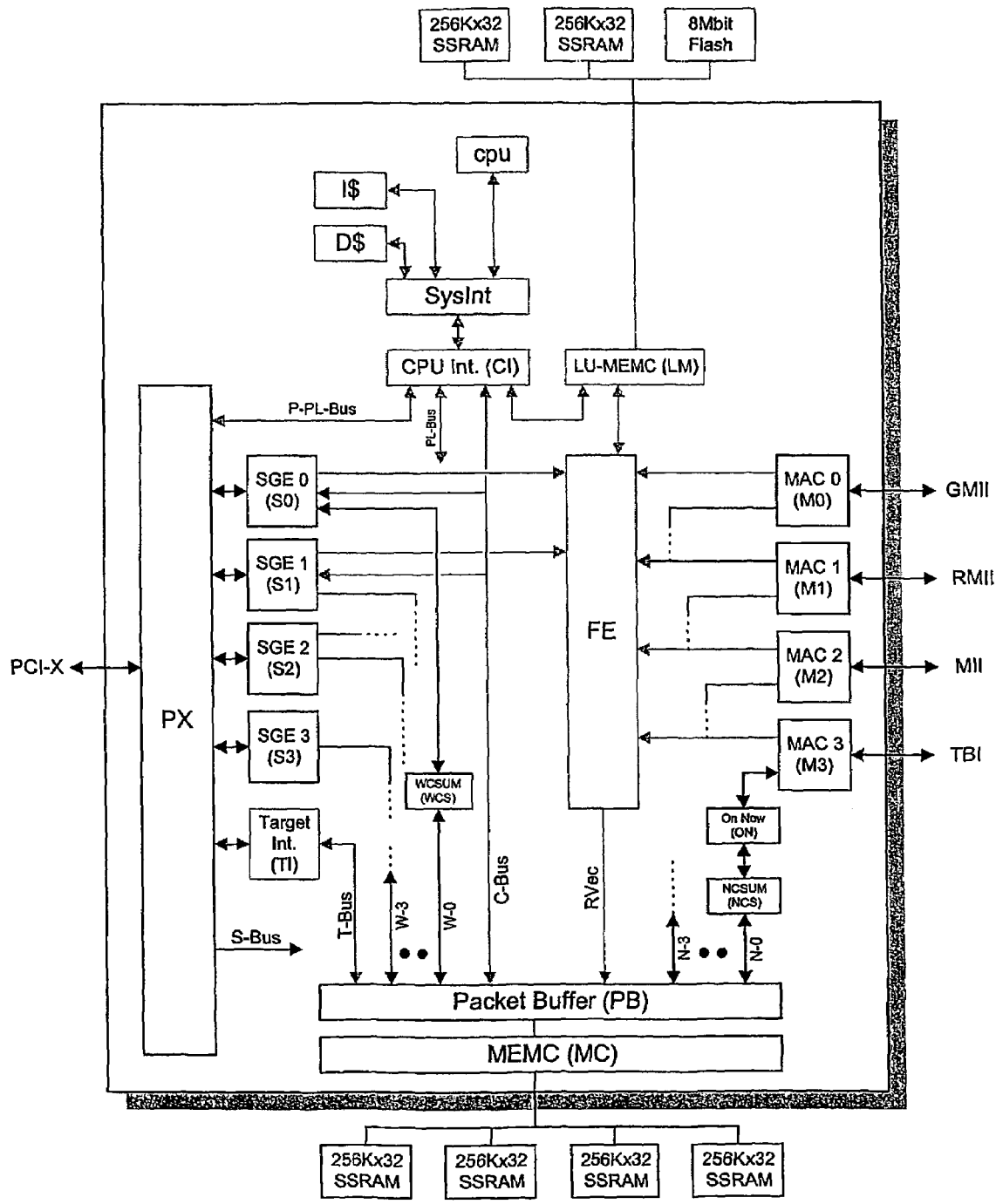

The NIC operation mode is now discussed with reference to FIGS. 2A and 2B. In general, the NIC operation mode is a relatively simple mode of operation of the FIG. 1 example circuit. A simplified block diagram of the NIC mode is represented in FIGS. 2A and 2B. In this mode, the on-chip processor 124, the forwarding engine 108 and the associated secondary memory 122 are not used (and, in fact, need not be even populated in the ASIC/FPGA) and, thus, are shown as "grayed out" in FIG. 2B. Various NIC operation mode operations are now described.

NIC Receive

In the NIC receive operation, data is received from the MAC 110, through the N-Bus, and stored in the PB 112 using, for example, the paging hardware of the packet buffer PB 112. The Rvec is determined in one example using a stub model, for the packet buffer PB 112 to determine from which queue it should push the data out. Once the data is completely stored in the appropriate queues of the packet buffer, it is then pushed to the appropriate Scatter Gather Engine 104. While transiting on the N-Bus, checksums are calculated on the incoming data from the MAC 110 by the NCS 126 and stored into the packet buffer PB 112. In one example, the checksum 110 storage is accomplished by strobing a payload (including the checksum) to the packet buffer PB 112 following the last element of the data being stored. The stored data is then transferred into the host memory from the PB 112 by the Scatter Gather Engine 104 (via the PX 102 and the PCI-X 101). In this mode of operation, the packet buffer PB 112 does not perform any broadcast or multicast operations and, as such, looks substantially like an external FIFO per channel.

NIC Transmit

In the NIC transmit mode, data is gathered from the host memory (via the PCI-X 101 and PX 102) by the appropriate SGE 104 and pushed to the packet buffer PB 112. While transiting the W-Bus, checksums are calculated on the data by the WCS 128 and delivered to the packet buffer PB 112 by strobing a payload (including the checksum) into the packet buffer PB 112 following storage of the last element of data. Once the packet is completely stored in the packet buffer PB 112, the packet is forwarded onto the N-Bus to the appropriate MAC 110.

NIC Fail Over

The link fail over is handled entirely in software.

NIC Multicast and Broadcast

These features are handled entirely in software.

NIC Flow Control

In the receive direction, once the descriptor queue of a TAP in the packet buffer PB 112 goes over a high water mark, a signal is asserted to the corresponding MAC 110 to cause the MAC 110 to generate flow control signals to its link partner. Depending on the MAC configuration, the traffic resumes either after a fixed amount of time or after the queue in the packet buffer PB 112 has dropped below the low water mark, the occurrence of which is also transmitted to the MAC 110. In the transmit direction, once the queue for the TAP, in the packet buffer, becomes full and data "backs up" into an SGE 104, the transmit function of the packet buffer 112 simply stops. In both directions, once the SGE 104 runs out of resources such as free lists or transmit buffers, traffic simply stops.

Figure 3A:
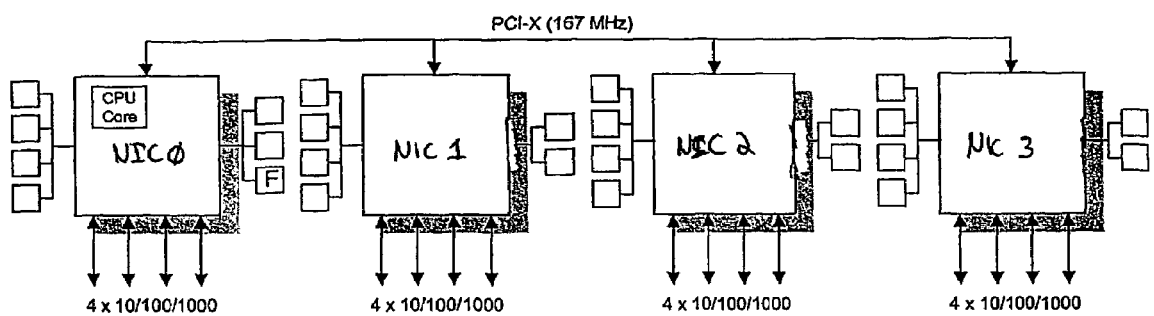
FIGS. 3A and 3B illustrate the FIG. 1 circuit in a switch configuration.
Figure 3B:
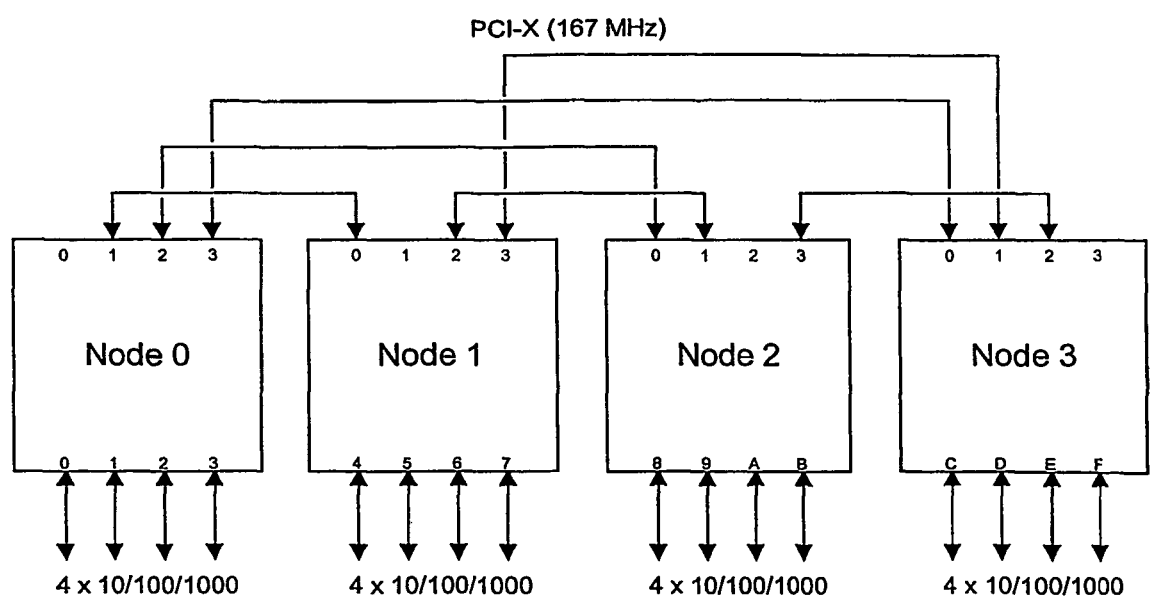

The switch operation mode is now described with reference to FIGS. 3A and 3B. In the switch configuration, the FIG. 1 example circuit employs the local forwarding engine FE 108 to make routing decisions for each packet in each direction. A given packet is examined once upon arrival to the source node and once upon exiting the destination node. The local processor CPU 125 is used for management purposes.

The switch backplane may be thought of as a virtual backplane. That is, the switch backplane includes multiple virtual channels on top of the PCI bus 101. Each virtual channel includes a scatter gather engine SGE 104 performing DMA writes to a reserved range of addresses in the host memory. That range of address is programmed into the receiving node's PCI base address register. Therefore, each pairing of the base address value programmed into a node's PCI base address register and the value programmed into another node's scatter gather engine 104 receive DMA address register configures a virtual channel. Each node is effectively a quad-function PCI device and hence has 4 memory base addresses, thus allowing 4 virtual full-duplex links to a node. This virtual back-plane of one example uses three base addresses, leaving the fourth one, corresponding to the node number of the device, unused.

In the switch mode of operation, the Scatter Gather Engine 104 does not do any linked list operations and simply pushes the data as consecutive data elements to the PCI 101. The data arriving from the PCI 101 is received on the PCI's target interface 106 which is then muxed to the appropriate SGE 104. The receive DMA address restarts at the base address at the start of every packet and the lower bits of the address are used to determine the length of a packet. Upper bits of the address, while still within the address range, are used to transfer additional information to the receiver. Each base address range is 256 Mbytes (28 bits). The largest packet that the switch handles is 64 Kbytes (16 bits), allowing 12 bits of payload (e.g., sequence numbers, etc.). Each node can be conceptualized, in some instances, as either a Source Node or a Destination Node. Source Node is the node where a packet initially comes into the system (via the Source Port), and Destination Node is the node through which the packet leaves the switch.

As data arrives from the MAC 110, the MAC 110 generates a long vector comprised of the DA, SA, VLAN, QoS fields of the incoming packet. This vector is then submitted to the forwarding engine FE 108. The packet then bypasses the checksum 126 and wake up 124 blocks before being written into the packet buffer PB 112. By this time, the forwarding engine 108 computes a routing vector 114 which is provided to the packet buffer 112 for the packet buffer 112 to place on the appropriate destination queue. In one example, a limit of 16 clocks is placed on the forwarding engine 108 for the lookup time per minimum sized packet (64 bytes). During this time, the forwarding engine 108 completes two lookups and a conditional learn operation.

Once the packet is fully stored in the packet buffer 112, it is pushed out one of the W-Buses to the SGE module 104. The SGE module 104—which operates as a pass through in the switch configuration—simply pushes the data out to the node that was indicated by the forwarding engine 108. The packet eventually appears on the target interface (T-Bus) of the destination node's PCI bus 101. Once the data arrives from the PCI bus 101 on the T-Bus of a destination node, the target interface 106 of the destination node routes the packet to the packet buffer 112 of the destination node. Meanwhile, the forwarding engine 108 computes a routing vector 114 for the packet and submits the routing vector 114 to the packet buffer 112.

Switch multicast and broadcast are handled in the forwarding engine 108. In case of a multicast or broadcast packet, the result is flagged to the packet buffer via a routing vector with multiple bits set.

In one example, the packet buffer 112 and the forwarding engine 108 can each pipeline two messages, to absorb the latency of the forwarding engine 108. The SGE 104 use flow control PIO writes to its link partner SGE to control the rate of the switch backplane traffic.

Figure 4:
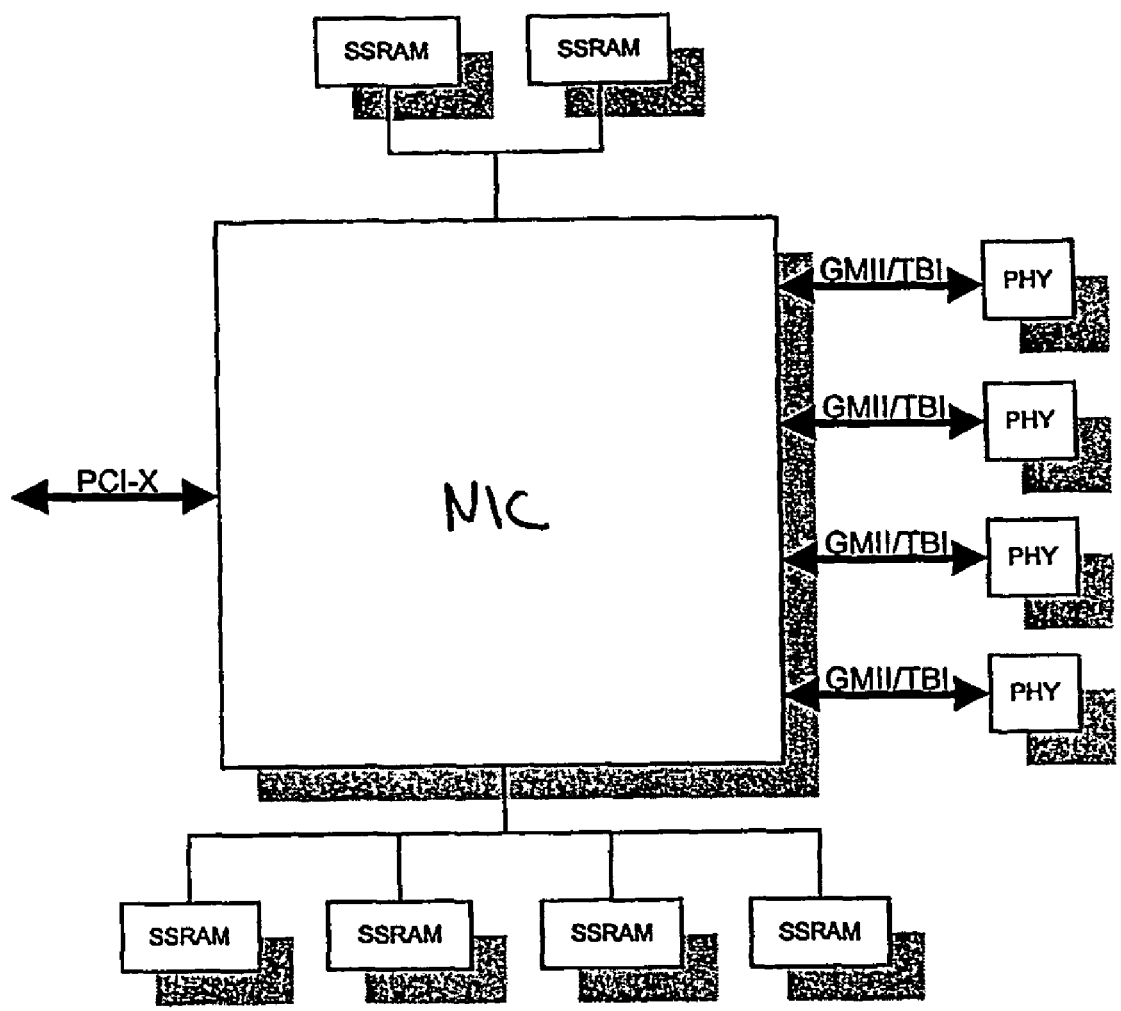
FIG. 4 illustrate the FIG. 1 circuit in a hybrid configuration.

The hybrid mode of operation is now described with reference to FIG. 4. In the hybrid mode of operation, the FIG. 1 example circuit acts as a 4-port switch combined with a up to a 4-port NIC. The FIG. 1 example circuit can "own" up to eight MAC addresses, four for its switched ports and up to four for its embedded NIC ports. The hybrid mode of operation is handled in the forwarding engine 108. Although the architecture allows for more, in some examples, the forwarding engine 108 has only enough bandwidth for a single port NIC. Power management logic is used in the hybrid mode to detect "magic packets," etc. and to generate appropriate power management events.

Once a packet arrives from the MAC 110 ("receive event"), the received packet is submitted to the forwarding engine 108. The received packet is concurrently written into the packet buffer 112 followed by checksum information. The Rvec 114 from the forwarding engine 108 indicates if the packet should be switched out of a port (via one of the N-Buses) or delivered to the host (via a W-Bus). Data received into the SGE 104 from the packet buffer 112 is typically delivered to the host.

For transmit, the data to be transmitted is normally gathered from the host memory into the packet buffer 112. However, the SGE 104 also submits the packet to the forwarding engine 108. The forwarding engine 108 in turn indicates to the packet buffer 112 onto which queue of the packet buffer 112 to place the packet. The checksums are calculated in this path. Although unlikely, one NIC port may wish to send a packet to another NIC port.

In the "system controller" mode of operation, any external host adapter is leveraged for interfacing to other protocols (e.g., SCSI, USB, SONET, USB, etc.). The NIC appear as a PC to the external host adapters. As such, the FIG. 1 example circuit provides a high bandwidth path to the local packet buffer 112. Further, a section of the packet buffer 112 is allocated as simple passive memory for use by the external host adapters. The external host adapters use this area to scatter and gather their traffic into the local memory 118. The processor 125 can access this data via the C-Bus path. Thus, in this mode, the FIG. 1 circuit is functioning as a system controller integrated with a processor.

Figure 5:
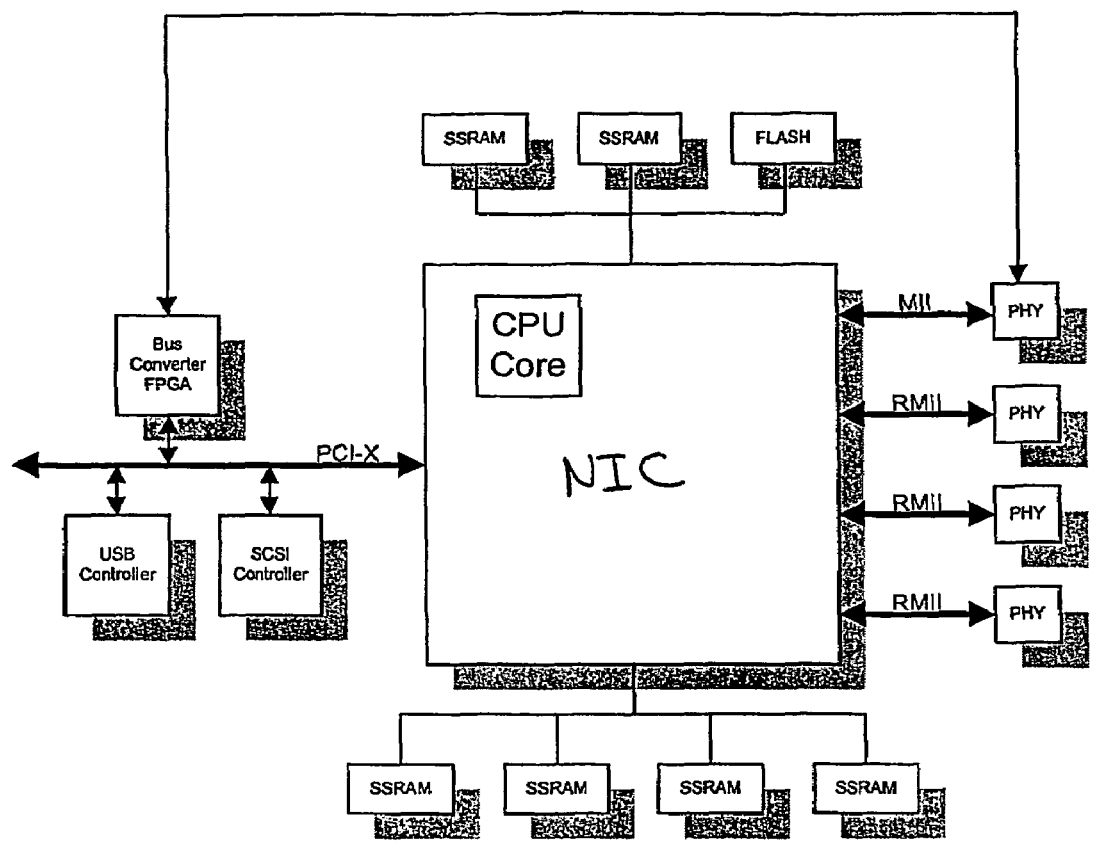
FIG. 5 illustrates the FIG. 1 circuit in a network processor configuration.

In the network processor mode of operation, represented in FIG. 5, firmware effectively "visits" every packet at the wire speed while relieving some of the overhead of packet processing. All the packet processing may then be performed via the firmware. This mode of operation can be thought of as a superset of the system controller mode of operation. In this mode of operation, it is generally desired to transfer data from one MAC 110 to another MAC 110 or to an external host adapter once the processor has had an opportunity to read and write portions of the packet. Once the packet is modified, the FIG. 1 circuit recomputes the checksums. In this configuration, the SGE modules 104 are used by the local processor 125 to access the packets via the queueing system. Thus, the head of the W-Bus FIFO in the SGE module 104 is read by the processor 125 via C-Bus and it is written to via C-Bus.

The network processor receive operation is now described. As packets arrive from the MAC 110, the checksums for the packets are computed (126) and the packets are written into the packet buffer 112. The packet buffer 112 operates in the NIC mode in this case. That is, there is effectively a hard path between N-Bus-0 to W-Bus-0, etc. The received data is pushed out to the respective SGE 104 via the respective W-Bus. Once the SGE 104 senses the presence of new data, it interrupts the local processor 125. The processor 125 then performs burst reads of SGE's 104 W-Bus receive FIFO into the data cache of the processor 125. Once the processor 125 has examined and rewritten the data, the processor 125 scatters the data into a portion of the packet buffer 112 not used for queuing. The data is then gathered by the external host adapter and consumed by the host adapter. Optionally, the data from the local processor 125 is burst written into the SGE's 104 transmit W-Bus FIFO. The checksum is computed (128) on this data by the FIG. 1 example circuit before being written into the packet buffer 112. Further, the routing vector from the first element of data is retrieved and submitted to forwarding engine 108 for multiplexing onto the Rvec bus 114 so as to place the packet on the desired N-Bus or W-Bus queue in the PB 112.

The network processor transmit operation is now described. When a packet is to be transmitted to the wire by an external host adapter, the packet is first scattered into the local memory 118 by the external host adapter. The packet is then read by the local processor 125 via the C-Bus. Once the local processor 125 has examined and rewritten the packet, the local processor 125 burst writes the packets along with a routing vector 114 into the transmit W-Bus queue of the SGE 104. The checksum on the packet is then computed (128) and the packet is forwarded to the N-Bus or W-Bus. If the packet to be transmitted is coming from another port of the same instantiation of the FIG. 1 circuit, the packet is first received by the local processor 125 and is then burst written into the SGE 104 along with a routing vector.

What is claimed is:

1. A network interface controller configured to facilitate communication among a host and external network connections to a network, comprising:

a plurality of scatter gather circuits configured to be connected to the host via a host bus;

a packet buffer configured for communication with the scatter gather circuits;

a plurality of access circuits configured to access the external network connections; and a forwarding engine selectable to generate routing information corresponding to particular data, received via a particular access circuit from a particular one the external network connections, wherein the particular access circuit is any of the plurality of access circuits, and to provide the routing information to the packet buffers, wherein the network interface controller is configured to selectively operate in at least a network interface controller mode of operation, in which the forwarding engine is inactive;

a switch mode of operation, in which the scatter gather circuits are configured for pass-through communication of the particular data between the packet buffer and host bus, and the forwarding engine is configured to generate the routing information to cause the particular data to be routed between the particular access circuit and the packet buffer; and a hybrid mode of operation, in which the forwarding engine is configured to process the particular data to determine whether the particular data is to be switched to another access circuit, different from the particular access circuit, to be provided to another external network connection, different from the particular external network connection, or whether the particular data is to be provided from the particular access circuit to the packet buffer and from the packet buffer to the scatter gather circuits for delivery to the host.

2. The network interface controller of claim 1, wherein, in the network interface controller mode of operation in which the network interface controller is configured such that the forwarding engine is inactive, the packet buffer and the plurality of access circuits are configured to communicate the particular data from the particular access circuit to the packet buffer; and the packet buffer and scatter gather circuits are configured to communicate the particular data from the packet buffer to the scatter gather circuits.

3. The network interface controller of claim 2, wherein:

the packet buffer and the plurality of access circuits being configured to communicate the particular data from the particular access circuit to the packet buffer includes the packet buffer being configured to utilize paging hardware thereof for receiving the particular data from the particular access circuit.

4. The network interface controller of claim 3, wherein:

the packet buffer and the plurality of access circuits being configured to communicate the particular data from the particular access circuit to the packet buffer includes the packet buffer being configured to selectively cause the particular access circuit to assert flow control signals to a corresponding link partner via the particular one of the external network connections.

5. The network interface controller of claim 1, wherein:

the forwarding engine being configured, in the switch mode of operation, to generate the routing information includes the forwarding engine being configured to compute a routing vector based on the particular data and to provide the computed routing vector to the packet buffer.

6. The network interface controller of claim 5, wherein:

in the switch mode of operation, the packet buffer is configured to process the received routing vector to control the flow of the particular data from the packet buffer.

7. The network interface controller of claim 1, wherein in the hybrid mode of operation:

the forwarding engine is configured to process the particular data and to generate the routing information therefrom; and the packet buffer is configured to process the generated routing information to selectively provide the particular data to the another access circuit or to the scatter gather circuits.

* * * * *

UNITED STATES PATENT AND TRADEMARK OFFICE
CERTIFICATE OF CORRECTION

PATENT NO. : 7,447,795 B2  Page 1 of 1
APPLICATION NO. : 10/474500
DATED : November 4, 2008
INVENTOR(S) : Naghshineh et al.

It is certified that error appears in the above-identified patent and that said Letters Patent is hereby corrected as shown below:

On the Title Page, Item (60)
(60)  Related U.S. Application Data:   Change "October 4, 2000" to --April 11, 2001--.

Signed and Sealed this

Thirteenth Day of January, 2009

JON W. DUDAS
*Director of the United States Patent and Trademark Office*